United States Patent Office 3,455,328
Patented July 15, 1969

3,455,328
SULFUR CONTAINING ELASTOMERS
Jacqueline C. Kane, Leonia, N.J., assignor to Stauffer Chemical Company, New York, N.Y., a corporation of Delaware
No Drawing. Filed Jan. 23, 1968, Ser. No. 699,795
Int. Cl. C08g 23/00; C09d 5/34
U.S. Cl. 260—79        7 Claims

ABSTRACT OF THE DISCLOSURE

Sulfur compositions useful as sealants and caulking compounds. The compositions are prepared by reacting a major amount of elemental sulfur and a minor amount of a polymercaptan plasticizer of the formula:

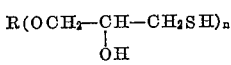

wherein R is the polyoxyalkylene moiety of the polyoxyalkylene glycol condensation product of an alkylene oxide having from 2 to 4 carbon atoms, inclusive, and a polyhydric alcohol having more than 2 and not more than 6 carbon atoms and more than 2 and not more than 6 hyhydroxy groups, said glycol having a molecular weight of at least 400; and $n$ is a number greater than 2 and not greater than 6.

---

This invention relates to sulfur containing elastomers particularly suited for use as sealants, caulking compounds, coatings, adhesives and molding compounds. More specifically, this invention is concerned with sulfur containing elastomers which are prepared by reacting a major amount of elemental sulfur and a minor amount of a polymercaptan plasticizer.

While a number of sulfur compositions have been prepared heretofore, those containing in excess of 50% sulfur were normally extremely hard and brittle. The incorporation of various plasticizers can alleviate the brittleness somewhat and provide impact resistant properties, but for the most part these compositions remain hard and are suggested for use as road marking compositions or in other applications where a rapid setting rigid product is desired.

It has now been discovered, however, that compositions containing a major amount of sulfur can be made elastomeric by the incorporation of a polymercaptan plasticizer and thus are useful for applications where breakage and cracking are prevalent. For example the compositions of this invention are useful as sealants, caulking compounds and the like. In addition they can be shredded and used as a low cost highly impact resistant packing material.

The polymercaptan plasticizers utilized in this invention can be represented by the formula:

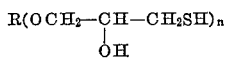

wherein R is the polyoxyalkylene moiety of the polyoxyalkylene glycol condensation product of an alkylene oxide having from 2 to 4 carbon atoms, inclusive, and a polyhydric alcohol having more than 2 and not more than 6 carbon atoms and more than 2 and not more than 6 hydroxy groups, said glycol having a molecular weight of at least 400; and $n$ is a number greater than 2 and not greater than 6.

In accordance with this invention the polymercaptan plasticizers are reacted with sulfur in a weight ratio of from 1:99 to 2:1 and preferably from 1:5 to 1:1 at a temperature and for a time sufficient to produce an elastomeric material.

The polymercaptan plasticizers can be prepared by first condensing an alkylene oxide having from 2 to 4 carbon atoms and about 0.01 to 17.0 mole percent based on the alkylene oxide of a polyhydric alcohol having less than 7 carbon atoms and having 3 to 6 hydroxy groups. The resulting polyoxyalkylene glycol is then reacted with an epihalohydrin, preferably chloro or bromo, to produce an intermediate halohydrin which is then reacted with an alkali metal sulfhydrate to produce the polymercaptan. For a more complete description, reference is made to Le Fave et al., U.S. Patent No. 3,258,495 issued June 28, 1966.

Quite surprisingly, the compositions of this invention set within seconds after mixing with sulfur at a temperature between about 130° C. and 200° C. but remain rubbery and flexible indefinitely and can be worked into any desired shape at room temperature. These properties and others, such as strength, adhesiveness and impermeability to water, make the compositions well suited for use as sealants and caulking compounds. The compositions can also be shredded and used as packing materials by reason of their excellent impact resistant properties.

To prepare the elastomeric compositions, the sulfur can be first melted and then any fillers and pigments added with the polymercaptan plasticizer. The order of addition, however, is not critical, and the materials can be dry mixed and then heated. Suitable fillers are the neutral or alkaline fillers, such as calcium carbonate, titanium dioxide, carbon black, silicas, clays, and talc.

In preparing the elastomers of this invention, it is desirable to add a small amount of an alkaline material to aid in combining the sulfur and polymercaptan reactants, but none is required. A variety of bases can be used as the alkaline material, such as the alkali metal and alkaline earth metal carbonates as well as organic primary, secondary and tertiary amines. If employed, only a minor amount of alkaline material is used. Generally from about 0.1% to about 2% by weight of the final composition is sufficient.

The temperature of the reaction should be maintained between about 118° C. and about 250° C. It is preferable, however, to maintain the temperature of the reaction between about 130° C. and about 170° C.

The following examples will serve to illustrate the invention and its preferred embodiments. All parts and percentages in said examples are on a weight basis.

Example 1

A trifunctional polyol having an equivalent weight of 1998 and being a propylene oxide derivative of 1,2,6-hexanetriol, is reacted with 101.8 grams (10% excess based on polyol) epichlorohydrin and stannic chloride.5H₂O (0.2% based on weight of polyol). The reaction is effected in a three-necked glass flask equipped with stirrer, thermometer, and condenser at a temperature of 110° C. for three hours. The intermediate trichlorohydrin is then reacted with 88.0 grams (10% excess based on polyol) of commercial sodium sulfhydrate, agitated, and heated at 115° C. for 2.0 hours. The resulting clear yellow-white liquid having a pH of 6.6 is decanted from the precipitated salt cake, analyzed and found to have a mercaptan equivalent of 0.39, 1.33% sulfur, and 0.1% chlorine.

Example 2

Five grams of calcium carbonate and 1 gram of a violet quinacridone pigment are preblended with 100 grams of the polymercaptan of Example 1 and added to 400 grams of molten sulfur at 150° C. contained in a stainless steel beaker. As soon as the plasticizer contacts the sulfur, it reacts to form a very rubbery mass which is subsequently removed and after excess sulfur had been squeezed out, molded into a ball. The material is extremely resilient and exhibits practically no cold flow.

Example 3

The procedure of Example 2 is repeated using 1 gram of phthalocyanine green pigment. The resulting product is rolled into long thin sheets.

Example 4

The procedure of Example 2 is repeated without pigment. The rubbery product is then shredded into urethane foam-like filling material and found to be highly impact resistant.

Example 5

A trifunctional polyol derived from glycerol having an equivalent weight of 975 and with the greatest portion of its structure consisting of repeating units of propylene oxide terminated with small amounts of ethylene oxide is reacted as in Example 1, and to the resulting trichlorohydrin is added 80.0 grams of commercial sodium sulfhydrate. The mixture is agitated and heated at 100° C. for 1.5 hours. The resulting mixture has a pH of 6.4 and the salt is then removed by filtration. Analysis indicates a mercaptan equivalent of 0.36, 2.44% sulfur and 0.1% chlorine.

Example 6

Five grams of calcium carbonate and 5 grams of red precipitated azo pigment of the beta-oxynaphthoic acid type are preblended with 100 grams of the polymercaptan of Example 5 and added to 400 grams molten sulfur at 150° C. contained in a 1200 ml. stainless steel beaker. Shortly after addition, a rubbery mass clumps around the stirring blade. This material is very tacky and exhibits a high degree of cold flow. Approximately 300 grams of unreacted sulfur is recovered from the reaction vessel.

Example 7

A trifunctional polyol having an equivalent weight of approximately 242 and being a propylene oxide derivative of trimethylol propane, is reacted with epichlorohydrin as in Example 1, and to the resulting product is added 80.0 grams of commercial sodium sulfhydrate. With agitation an immediate rise in temperature is noted to 120 degrees centigrade. Upon termination of the exotherm, heat is added to maintain the mixture at 110 degrees centigrade for a period of 1.5 hours. Upon completion of the reaction the mixture has a pH of 6.7 and the salt is then removed by filtration. The solution is clear amber, having a mercaptan equivalent of 2.73, and contains 7.11% sulfur and 0.07% chlorine.

Example 8

In accordance with Example 6, a composition is prepared by substituting 5 grams of the polymercaptan of Example 7 for a like amount of the polymercaptan of Example 5. The resulting composition is somewhat tacky, moderately resilient and exhibits a marked decrease in cold flow over the product obtained in Example 6.

Example 9

The procedure of Example 6 is repeated employing a plasticizer blend of 25 grams of the polymercaptan of Example 7 and 75 grams of the polymercaptan of Example 5. The resulting material is not tacky, exhibits no cold flow and is moderately resilient.

Example 10

The procedure of Example 6 is repeated employing a plasticizer blend of 30 grams of the polymercaptan of Example 7 and 70 grams of the polymercaptan of Example 5. The resulting material is hard and unmoldable.

What is claimed is:

1. An elastomer comprising the reaction product of elemental sulfur and a polymercaptan of the formula:

$$R(OCH_2-CH-CH_2SH)_n$$
$$\phantom{R(OCH_2-C}|$$
$$\phantom{R(OCH_2-CH}OH$$

wherein R is the polyoxyalkylene moiety of the polyoxyalkylene glycol condensation product of an alkylene oxide having from 2 to 4 carbon atoms and a polyhydric alcohol having more than 2 and not more than 6 carbon atoms and more than 2 and not more than 6 hydroxy groups, said glycol having a molecular weight of at least 400, and $n$ is a number greater than 2 and not greater than 6, in a ratio of sulfur to polymercaptan of from 99:1 to 1:2 by weight.

2. An elastomer of claim 1, wherein the ratio of sulfur to polymercaptan is from about 5:1 to about 1:1.

3. An elastomer of claim 1 additionally comprising a minor amount of a neutral or alkaline filler.

4. An elastomer of claim 1, wherein the polymercaptan is derived from epichlorohydrin and glycerol.

5. An elastomer of claim 1, wherein the polymercaptan is derived from epichlorohydrin and a propylene oxide derivative of 1,2,6-hexanetriol.

6. An elastomer of claim 1, wherein the polymercaptan is derived from epichlorohydrin and a propylene oxide derivative of trimethylol propane.

7. An elastomer of claim 1, additionally comprising a minor amount of a pigment.

References Cited

UNITED STATES PATENTS

| 3,258,495 | 6/1966 | Le Fave et al. | 260—609 |
| 3,278,496 | 10/1966 | Le Fave et al. | 260—79 |
| 3,316,115 | 4/1967 | Barnes | 106—287 |

DONALD E. CZAJA, Primary Examiner

M. I. MARQUIS, Assistant Examiner

U.S. Cl. X.R.

251—215, 357